United States Patent [19]

Levin et al.

[11] Patent Number: 4,735,997

[45] Date of Patent: Apr. 5, 1988

[54] NUCLEOPHILIC SUBSTITUTION OF CHLORINE CONTAINING POLYMERS IN AQUEOUS MEDIUM BY AMIDO-THIOLATE GROUPS

[75] Inventors: Gideon Levin, Rehovot; Hemi N. Nae, Givat Shmuel, both of Israel

[73] Assignee: Yeda Research & Development Company Limited, Rehovot, Israel

[21] Appl. No.: 795,870

[22] Filed: Nov. 7, 1985

[30] Foreign Application Priority Data

Nov. 6, 1985 [IL] Israel ............................................ 70148

[51] Int. Cl.$^4$ .................................................. C08F 8/34
[52] U.S. Cl. .................... 525/331.5; 525/54.1; 525/334.1; 525/351
[58] Field of Search .................. 525/54.1, 331.5, 334.1

[56] References Cited

U.S. PATENT DOCUMENTS

| | | | |
|---|---|---|---|
| 3,261,786 | 7/1966 | Breslow | 525/351 |
| 3,282,978 | 11/1966 | Swakon | 525/351 |
| 3,790,534 | 2/1974 | Gattuso et al. | 525/351 |
| 3,832,348 | 8/1974 | Coran et al. | 525/351 |
| 3,892,688 | 7/1975 | Motani et al. | 521/32 |
| 4,165,310 | 8/1979 | Morita | 525/351 |
| 4,248,805 | 2/1981 | Sullivan et al. | 525/351 |
| 4,298,714 | 11/1981 | Levin et al. | 525/351 |

OTHER PUBLICATIONS

"Chemical Modification of Polyvinyl Chloride and Related Polymers" by Okawara, Apr. 1979.
1969 publication, "Syntheses and Reactions of Functional Polymers, XL, Enhanced Reactivity of Poly(vinyl chloride) by Neighboring-Group Participation of the N,N–Disubstituted Dichiocarbamate Function" by Nakai et al.

Primary Examiner—Joseph L. Schofer
Assistant Examiner—Bernard Lipman
Attorney, Agent, or Firm—Browdy and Neimark

[57] ABSTRACT

There are provided polymers containing amido-thiolate groups. These are produced by a nuceophilic substitution of polymers containing chlorine, and the resulting polymers have a pronounced hydrophylic character. There is also provided a process for the production of these starting with polymers which contain chlorine in the polymeric backbone or in side chains.

6 Claims, 1 Drawing Sheet

NUCLEOPHILIC SUBSTITUTION OF CHLORINE CONTAINING POLYMERS IN AQUEOUS MEDIUM BY AMIDO-THIOLATE GROUPS

FIELD OF THE INVENTION

There are provided novel polymeric compositions of matter wherein at least part of chlorine atoms of the original polymer are substituted by amidothiolate groups. There is also provided a process for the production of such polymers. The modified polymers have a more hydrophilic character than the unmodified ones and this property is of advantage in many applications.

BACKGROUND OF THE INVENTION

Chemical modification of polymeric materials containing chlorine atoms are numerous and well known. The best known chlorine containing polymer is polyvinylchloride. The usual approach of modification of this polymer is by means of grafting onto the macromolecules of various other reactive monomers, or telomers, or other entities, by chemical, photochemical or radiation induced reactions. Recently, Kennedy has developed a general method for the chemical grafting of certain monomers to PVC, using an alkyl aluminum catalyst (Cationic Graft Copolymerization, Ed. J. P. Kennedy, Interscience, 1977).

The methods mentioned above lack practicality because an expensive and dangerous catalyst is used. In addition, to effect a grafting reaction on PVC in accordance with the various methods described in the literature, the PVC has to be dissolved in an organic anhydrous solvent, such as cyclohexanone, or tetrahydrofuran, forming very viscous solutions even at quite low concentrations, which are extremely difficult to handle in a chemical process. This is the main reason why previous attempts to modify PVC by grafting reactions remain to date a laboratory exercise only.

A well known drawback of commercial PVC compositions is their hydrophobic nature. This results in the accumulation of static electricity, and the easy deposition of dust, which in certain application (music records, greenhouse coverings, textile fibers) is very deleterious. Another well known drawback of commercial PVC is its degradation while exposed to the combined action of sunlight, oxygen of air, humidity, and acidic pollutants. This leads to a substantial modification of the aspect (color, gloss) as well as of the mechanical properties (hardness, elasticity, impact resistance) of the irradiated material.

SUMMARY OF THE INVENTION

There are provided modified graft polymers wherein part of the chlorine atoms of the starting polymer are substituted by amido-thiolate groups of the general formula

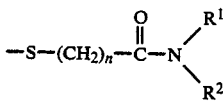

wherein n is an integer from 1 to 20 and $R^1$ and $R^2$, which may be identical or different, each designating hydrogen or an alkyl, a polyamide or a polyamino group.

There is also provided a process for the production of such modified polymers starting with chlorine containing polymers, which may contain chlorine atoms in the polymeric backbone on in side chains. The process is effected in an essentially aqueous medium in which the polymer to be modified is provided in suspension, emulsion or in the form of particulate matter or in the form of films or sheets. The reaction is advantageously carried out at a pH in the basic range at moderately elevated temperature and in the presence of a phase transfer catalyst.

In the following the invention is illustrated with reference to polyvinylchloride (PVC), but this is by way of example only and it ought to be clearly understood that the invention applies also to other polymers which contain chlorine and which may be subjected to the grafting (substitution) reaction of the present invention. The reaction in accordance with this invention is commonly referred to as a "nucleophilic substitution reaction" which is documented in the literature (see Okawara et al, Kogga Kagadu Zasshi 70, 2382 (1967); Okawara Joint Conference ACS and JCS, Hawaii 1979).

The grafting reaction is represented by the following scheme:

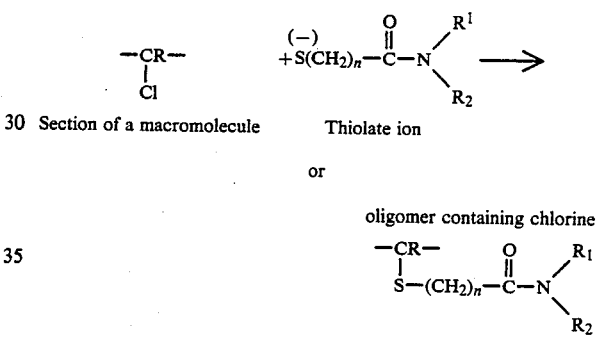

where 'n' is an integer of 1 to 20, R and $R_2$ are hydrogen or an alkyl group such as methyl ethyl etc. $R_1$, is hydrogen or an alkyl, benzoyl, polyamide or polyamino acid group.

While the above scheme represents the process in accordance with the invention, the preferred reaction is the one wherein $R_1$ stands for —H and $R_2$ is alkyl.

As will be seen from following examples the rate of chlorine displacement is influenced by adding an essentially non-polar swelling agent and a phase transfer catalyst. The surprising feature of the present invention is the extreme ease with which the thiolate amide group may be grafted to P.V.C. in emulsion or suspension in a substantially aqueous medium. To effect the reaction the P.V.C. emulsion, or suspension as it emerges from the polymerization reactor, or indeed before being discharged from the reactor, is mixed together with an aqueous solution of the desired alkali or alkaline earth thiolate of the compound to be grafted, the final pH of the mixture being about 13-14 and the temperature 0°-100° C. and preferably 40°-60° C. To facilitate and expedite the reaction, a small amount of an essentially non-polar solvent such as cyclohexanone or THF is added. This solvent penetrates the PVC particles and causes them to swell somewhat, thus facilitating the penetration of the thiolate moiety to the reaction site. Beside this, a phase transfer catalyst such as tricaprylyl methyl ammonium chloride is added in order to accelerate the transfer of the thiolate from the water phase to the solid PVC phase. Upon completion of the reaction, the polymeric product is caused to coagulate and is separated in a conventional manner.

The utility of products obtained according to this invention is well recognized since grafted amide group on PVC result in altered properties such as an electrostatic charge accumulation and UV light absorption. The polymer has a more hydrophilic characteristic and it is possible to further modify the polymer through reactions of the amide groups.

The degree of altering the above properties depends on the degree of substitution. We obtained a 50% substitution of chlorine by thioamide groups.

The modified polymers become soluble in chloroform and in other solvents, such as THF and nitrobenzene. The polymers may be compounded and processed by the usual methods such as extrusion coating, calandering and injection molding.

The following examples illustrate the process and nature of the novel modified PVC compound.

EXAMPLES

General Procedure

Figure 1:
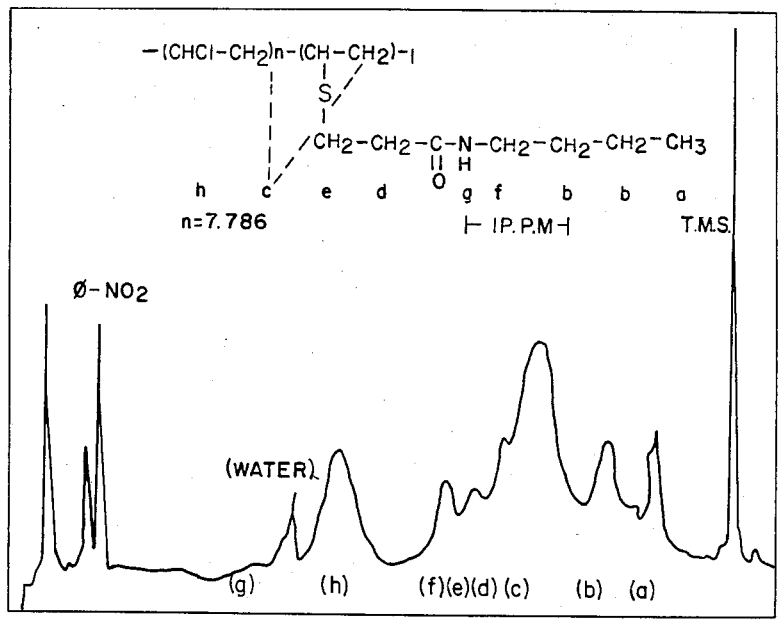
FIG. 1 shows an 80 MHz proton N.M.R. of PVC in which the chlorine is substituted by N-butyl 3 thiopropionamide. Solvent: $\phi NO_2$. Please note that the reference to the functional groups appears in the figure.

A measured amount of suspension or emulsion of polyvinyl chloride (Frutarom, Electrochemical Co., Haifa, Israel) in water was continuously stirred and heated on an oil bath. A solvent such as DMF, THF, cyclohexanone or methylethylketone is added to the slurry. While mixing, the sodium or calcium salt of N-butyl-3-mercaptopropionamide was added. At the same time, a small amount of tricaprylyl methyl ammonium chloride (phase transfer catalyst) was added to the reaction mixture. The reaction mixture was kept at 60° C. and from time to time samples were withdrawn from the reaction mixture. The suspension is separated and the polymer is washed several times with distilled water, methanol and ether. The polymer obtained after washing is dissolved in tetrahydrofuran or chloroform and reprecipitated in methanol. The polymers obtained in this way were analyzed for sulfur, nitrogen and chlorine; NMR and IR of the grafted polymer were also taken.

EXAMPLE NO. (1)

(a) Composition of reaction mixture
Epivyl 43–80 cc (PVC suspension, 40% solids)
Mw = 1.88 × 10⁵

| | |
|---|---|
| HS—CH$_2$—CH$_2$—C(=O)—N(H)—(CH$_2$)$_3$—CH$_3$ | 36.8 gr |
| CaO | 8.7 gr |
| cyclohexanone | 10 ml |
| Tricaprylyl methyl ammonium chloride | 1 gr |

(b) Conditions: 60° C., varied amount of time
(c) Results

The relation between the reaction time and the chlorine and sulfur content of the grafted polymer appears in Table 1.

TABLE 1

The relation between the sulfur [S] and chlorine [Cl] content of the grafted PVC and the time of reaction*.

| Time (min) | [Cl] % | [S] % | Extent of reaction |
|---|---|---|---|
| 30 | 50.25 | 1.57 | 0.0917 |
| 45 | 49.90 | 2.06 | 0.1203 |
| 75 | 47.30 | 2.45 | 0.1432 |
| 120 | 44.75 | 3.28 | 0.1922 |
| 175 | 42.65 | 4.00 | 0.2337 |
| 240 | 39.20 | 4.67 | 0.2729 |
| 300 | 36.95 | 5.75 | 0.3360 |
| 1295 | 23.75 | 9.15 | 0.5347 |

The relation between the elemental analysis and the NMR appears in Table 2

TABLE 2

Relation between NMR and elemental analysis of N butyl-3-thiopropionamide grafted on PVC.

| Grafted polymer | | Elemental analysis sulfur | chlorine | nitrogen | Ratio of substitution by elemental analysis (CH$_2$—CHCl):(CH$_2$—CH(S~)) | N.M.R. analysis Ratio of substitution (CH$_2$—CHCl):(CH$_2$—CH(S~)) |
|---|---|---|---|---|---|---|
| 1 | Experimental | 4.75 | 38.6 | — | 7.87:1 | 7.50:1 |
| | Theory | 4.75 | 41.03 | — | | |
| 2 | Experimental | 9.15 | 23.75 | 4.05 | 2.60:1 | 2.34:1 |
| | Theory | 9.15 | 26.41 | 4.01 | | |

EXAMPLE NO. 2

| | |
|---|---|
| Water | 220 cc |
| Cyclohexanone | 10 cc |
| HS—(CH$_2$)$_2$—C(=O)—N(H)—(CH$_2$)$_3$—CH$_3$ | 20 gr |
| CaO | 3.5 gr |
| Tricaprylyl methyl Ammonium chloride | 2.0 gr |

Film (50 μm) PVC
Reaction time 1 hr. and 7 hr.

RESULTS

The sulfur and the chlorine contents of the polymer are as follow:

After 1 hr. of immersing the film in the above reaction mixture at 56° we found:
Sulfur 4.0%
Chlorine 42.3%

After 7 hr. of immersing the film in the above reaction mixture at 56° C. and analyzing for sulfur and chlorine in the film we found:
Sulfur 11.2%
Chlorine 13.1%

After 50 hr of immersing the film in the above reaction mixture at 28° C. and analyzing for sulfur and chlorine we found
Sulfur 4%
Chlorine 42.3%

EXAMPLE NO. 3

| Water | 220 cc |
| Cyclohexanone | 10 cc |
| 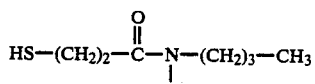 | 20 gr |
| CaO | 3.5 gr |
| Tricaprylyl methyl Ammonium chloride | 2.0 gr |

Film (50 μm): chlorinated (44% chlorine) low density polyethylene. The film was made by dissolving chlorine gas in CCl$_4$, immersion of the film in it and illuminating the reaction mixture with tungsten lamp.

RESULTS

After 1 hr at 56° C. the % of sulfur and chlorine in the film was found to be 1.3% and 43.4% respectively.

After 7 hr at 56° C. the % of sulfur and chlorine in the film was found to be 2.5% and 33% respectively.

We claim:

1. A modified polymer produced by nucleophilic substitution of a chlorinated polymer selected from the group consisting of polyvinyl chloride and chlorinated polyethylene, having chlorine atoms susceptible to nucleophilic substitution, wherein a portion of said susceptible chlorine atoms have been substituted by a group of the formula:

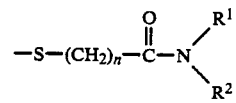

where n is an integer of 1 to 20 and $R_1$, $R_2$ are each selected from the group consisting of hydrogen, alkyl, polyamide and polyamino acid groups.

2. A modified polymer according to claim 1, where $R_1$ is hydrogen and $R_2$ is butyl, and n is 2.

3. A modified polymer according to claim 1, wherein said chlorinated polymer is a polyvinyl chloride.

4. The modified polymer of claim 1, wherein $R_1$ and $R_2$ are selected from the group consisting of alkyl or H.

5. The product of claim 1, wherein said modified polymer comprises 1–10% sulfur in the form of said substituted group.

6. The product of claim 4, wherein said modified polymer comprises 1–10% sulfur in the form of said substituted group.

* * * * *